US012358023B2

(12) United States Patent
Tsai et al.

(10) Patent No.: US 12,358,023 B2
(45) Date of Patent: Jul. 15, 2025

(54) OSCILLATORY SEPARATION DEVICE

(71) Applicant: Taiwan Mercury Medical Corporation, New Taipei (TW)

(72) Inventors: Chih-Chia Tsai, New Taipei (TW); Yung-Hsun Wu, New Taipei (TW)

(73) Assignee: Taiwan Mercury Medical Corporation, New Taipei (TW)

( * ) Notice: Subject to any disclaimer, the term of this patent is extended or adjusted under 35 U.S.C. 154(b) by 63 days.

(21) Appl. No.: 18/221,826

(22) Filed: Jul. 13, 2023

(65) Prior Publication Data

US 2024/0399419 A1 Dec. 5, 2024

(30) Foreign Application Priority Data

Jun. 2, 2023 (TW) ................................ 112120638

(51) Int. Cl.
*B07B 1/30* (2006.01)

(52) U.S. Cl.
CPC ...................................... *B07B 1/30* (2013.01)

(58) Field of Classification Search
CPC .... B07B 1/28; B07B 1/38; B07B 1/42; B07B 1/46; A61J 3/06; B08B 7/02
USPC .......................................................... 209/244
See application file for complete search history.

(56) References Cited

U.S. PATENT DOCUMENTS

| | | | | |
|---|---|---|---|---|
| 11,958,076 | B2 * | 4/2024 | Hol | B07B 1/38 |
| 2012/0024764 | A1 * | 2/2012 | Krush | B07B 1/54 209/326 |
| 2022/0212233 | A1 * | 7/2022 | Hol | B07B 1/38 |
| 2023/0294360 | A1 * | 9/2023 | Tsai | B33Y 40/00 425/216 |

FOREIGN PATENT DOCUMENTS

| | | | | |
|---|---|---|---|---|
| AU | 2023216741 B1 | * 3/2024 | | A61J 3/06 |
| CN | 206199675 U | * 5/2017 | | |
| CN | 109499850 A | * 3/2019 | | |
| CN | 114053150 A | * 2/2022 | | |
| GB | 2486525 B | * 11/2013 | | B07B 1/38 |
| JP | H1147692 A | * 7/1997 | | |
| SU | 1052281 A2 | * 11/1983 | | |

* cited by examiner

*Primary Examiner* — Terrell H Matthews
(74) *Attorney, Agent, or Firm* — Ying-Ting Chen; Law Office of Michael Chen

(57) ABSTRACT

An oscillatory separation device comprises a base, an elastic support, a shell assembly, a screen mesh, a discharge port and an opening element, one end of the support is disposed on the base, the shell has first and second spaces communicating with each other and capable of accommodating a sieved object, a lower part of the shell is combined with another end of the support, the screen mesh is placed in the shell to separate the first and second spaces, and is detachably assembled with the shell, the discharge port is formed on an outer circumference of the shell and communicates with the first space, so that the sieved object can be discharged externally through the discharge port, the opening element is disposed on the shell and communicates with the first and second spaces, and the sieved object is thrown into the shell through the opening element.

9 Claims, 5 Drawing Sheets

OSCILLATORY SEPARATION DEVICE

BACKGROUND OF THE INVENTION

Field of Invention

The invention relates to a separation device, and more particularly to an oscillatory separation device capable of greatly shortening a manufacturing process.

Related Art 3D printing technology, also known as "incremental manufacturing", is a process of continuously adding and layering raw materials under computer control. With the advancement and development of science and technology, in the past ten years, 3D printing has been gradually applied in many fields, from food, clothing, shell and transportation to humanities and art, from household accessories to environmental reconstruction, from auto parts to rocket shells, all involved in 3D printing technology. The advantage is that the production is fast, and the time and cost of the manufacturing process are greatly reduced. Recently, 3D printing has also been applied to medical fields such as manufacturing of transplanted organs, apparatuses, equipment and medicines.

Different from the traditional way of using mechanical pressure to make medicine tablets, 3D printers use the concept of stacking layers to print a layer of medicine powder first, then a layer of adhesive components of medicine powder, and then a layer of medicine powder, and so on to form medicine tablets by stacking layers. The drugs produced by this technology have a porous internal structure and a large internal surface area, so the drugs can be melted by a small amount of water in a short time. Only a small sip of water can quickly disperse a medicine tablet, which is one of the great blessings for those who have difficulty in swallowing.

In addition, in the 3D printing process, a variety of flavoring agents can be added between layers of printing steps, so it can provide more diverse flavoring products than before. In addition, 3D printing technology can also adjust the dose of medicine according to the patient's conditions, which can be regarded as a big leap forward in the field of personalized medical treatment.

However, when performing the 3D printing process to form medicine tablets, since a layer of medicine powder and a layer of adhesive components of medicine powder are stacked layer by layer alternatively to form the medicine tablets, a lot of residual powder will be produced during the manufacturing process, the residual powder must be cleaned and brushed off from the medicine tablets by means of a brush or other equivalent devices for removing powder, which will result in considerable time-consuming labor and increased production costs.

Therefore, relevant manufacturers engaged in this industry are eager to research and make improvement to solve the above-mentioned problems and drawbacks in the prior art.

SUMMARY OF THE INVENTION

Therefore, in order to effectively solve the above-mentioned problems, a main object of the invention is to provide an oscillatory separation device capable of greatly shortening a manufacturing process.

A secondary object of the invention is to provide an oscillatory separation device capable of avoiding damage to medicine tablets.

Another secondary object of the invention is to provide an oscillatory separation device capable of reducing an oscillatory amplitude of the oscillatory separation device.

Another secondary object of the invention is to provide an oscillatory separation device capable of not affecting a surrounding environment and surrounding devices.

Another secondary object of the invention is to provide an oscillatory separation device capable of achieving efficacies of quick disassembly and replacement.

In order to achieve the above objects, the invention provides an oscillatory separation device comprising a base, an elastic support, at least one shell assembly, a screen mesh, a discharge port and an opening element, one end of the elastic support is correspondingly disposed on the base, the shell assembly has a first space and a second space communicating with each other and capable of accommodating a sieved object, a lower part of the shell assembly is correspondingly combined with another end of the elastic support so that the shell assembly is swingably connected to the base, the screen mesh is placed in the shell assembly to separate the first space and the second space, and can be detachably assembled with the shell assembly, the discharge port is formed on an outer circumference of the shell assembly and communicates with the first space, so that the sieved object can be discharged externally through the discharge port, the opening element is disposed on the shell assembly and communicates with the first and second spaces, and the sieved object is thrown into the shell assembly through the opening element.

In one embodiment, the shell assembly further comprises a first shell and a second shell that are detachably correspondingly combined with each other, the first space is formed inside the first shell, the second space is formed inside the second shell, and the screen mesh is disposed between the first and second shells.

In one embodiment, an outer peripheral edge of the first shell further protrudes outward to form a first flange, an outer peripheral edge of the second shell further protrudes outward to form a second flange, and a buffer element is correspondingly sandwiched on the first and second flanges.

In one embodiment, the buffer element and the screen mesh are integrally formed or non-integrally formed structurally.

In one embodiment, the shell assembly further has a first fixing member, so that the base and the second shell are locked with each other through the first fixing member.

In one embodiment, the shell assembly further has a second fixing member, and the buffer element and the first and second shells are locked with one another through the second fixing member.

In one embodiment, a feeding assembly is further provided on the opening element, and the feeding assembly extends upward to form an extension for preventing the sieved object from dispersing and accelerating the sieved object to flow into the shell assembly.

In one embodiment, a pressure regulating valve is further provided inside the base, and the pressure regulating valve can be linked with a pressure regulating device.

In one embodiment, a vibrating device is further provided inside the base for vibrating the shell assembly so that the sieved object in the shell assembly can be oscillated and separated.

In one embodiment, further comprising a moving component, and the base is mounted on the moving component to be capable of sliding back and forth.

Therefore, with the structural design of the invention, after a worker puts the sieved object (medicine tablet) into the shell assembly, and then activates the vibrating device to shake the first and second shells, the first and second shells will oscillate from side to side due to a structure of the elastic support, while the first and second shells are swaying from side to side, residual powder on the sieved object (medicine tablet) will be screened out during a process of swaying and oscillating to achieve an efficacy of removing the residual powder, so that a manufacturing process can be greatly shortened. Since the shell assembly is oscillating from side to side, damage of the medicine tablet caused by bouncing and colliding upward and downward can be avoided. In addition, through a design of the elastic support, a buffering effect can be achieved, an oscillatory amplitude of the oscillatory separation device can be greatly reduced, and a surrounding environment and surrounding devices of a pharmaceutical factory will not be affected.

In addition, due to the structural design of the moving component, the base can be mounted on the moving component to be capable of sliding back and forth. Since jamming of medicine powder is a common problem in pharmaceutical factories during a process of separating medicine tablets, this structural design complies with pharmaceutical regulations, after sliding the oscillatory separation device outside of a workstation through the moving component, the oscillatory separation device is directly disassembled and cleaned, and at the same time new shell assembly, screen mesh can be replaced to achieve modularization and greatly increase a work efficiency.

DETAILED DESCRIPTION OF THE INVENTION

The above objects of the invention, as well as its structural and functional features, will be described in accordance with the preferred embodiments of the accompanying drawings.

In the following, for the formation and technical content related to an oscillatory separation device of the invention, various applicable examples are exemplified and explained in detail with reference to the accompanying drawings; however, the invention is of course not limited to the enumerated embodiments, drawings, or detailed descriptions.

Furthermore, those who are familiar with this technology should also understand that the enumerated embodiments and accompanying drawings are only for reference and explanation, and are not used to limit the invention; other modifications or alterations that can be easily implemented based on the detailed descriptions of the invention are also deemed to be within the scope without departing from the spirit or intention thereof as defined by the appended claims and their legal equivalents.

And, the directional terms mentioned in the following embodiments, for example: “above”, “below”, “left”, “right”, “front”, “rear”, etc., are only directions referring in the accompanying drawings. Therefore, the directional terms are used to illustrate rather than limit the invention. In addition, in the following embodiments, the same or similar elements will be labeled with the same or similar numbers.

Figure 1:
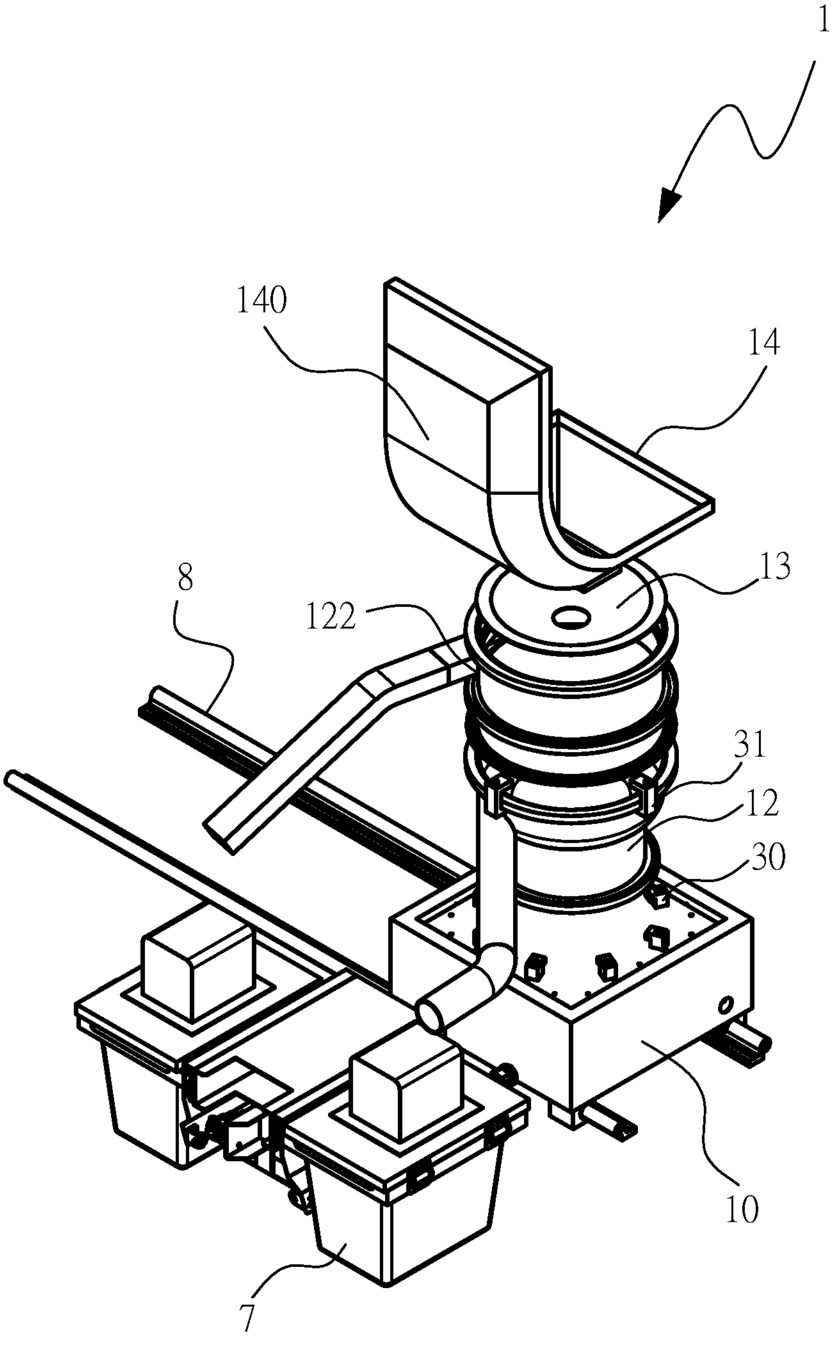
FIG. 1 is a perspective exploded view of a first embodiment of an oscillatory separation device of the invention.
Figure 2:
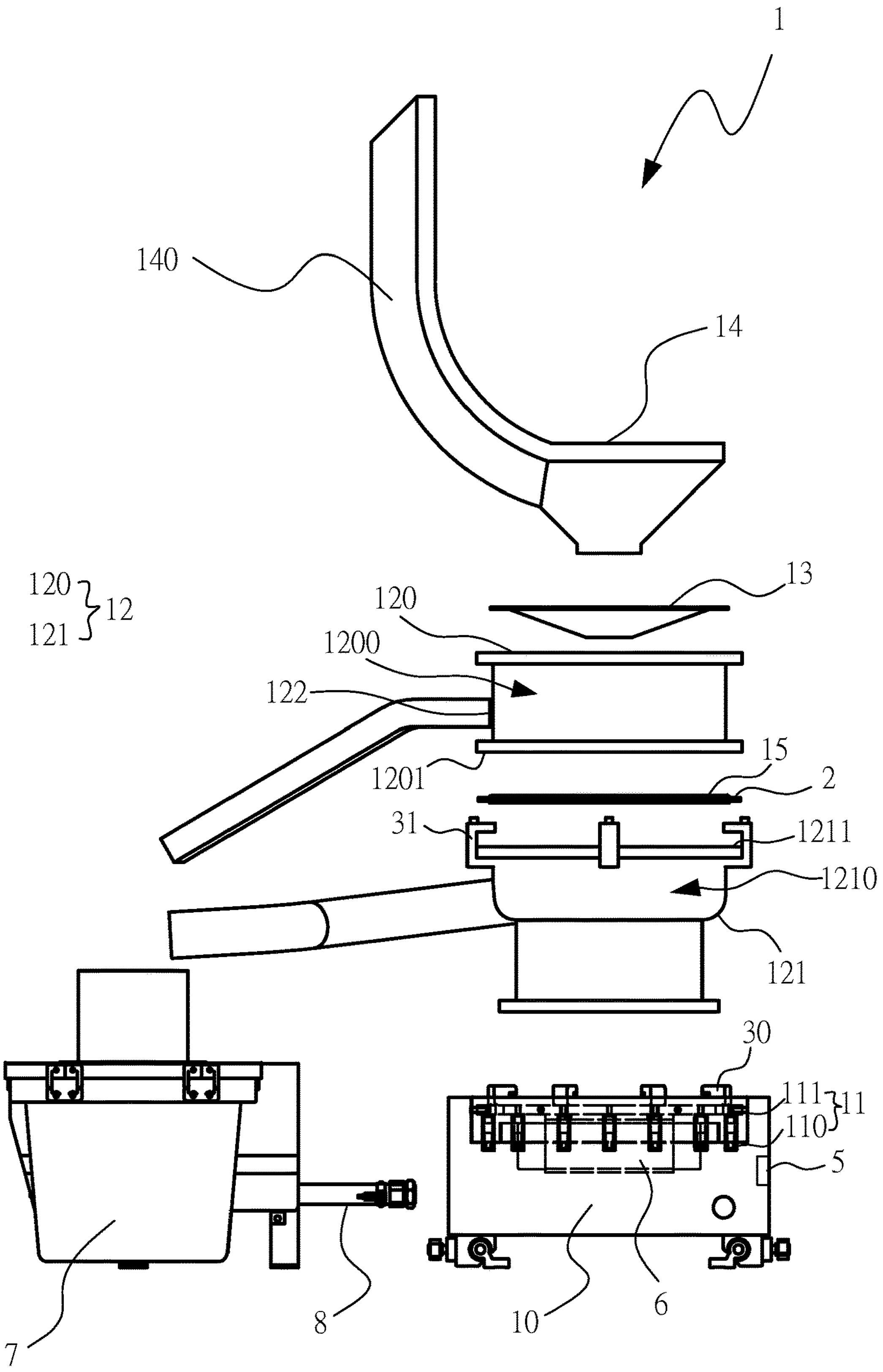
FIG. 2 is a side exploded view of the first embodiment of the oscillatory separation device of the invention.
Figure 3:
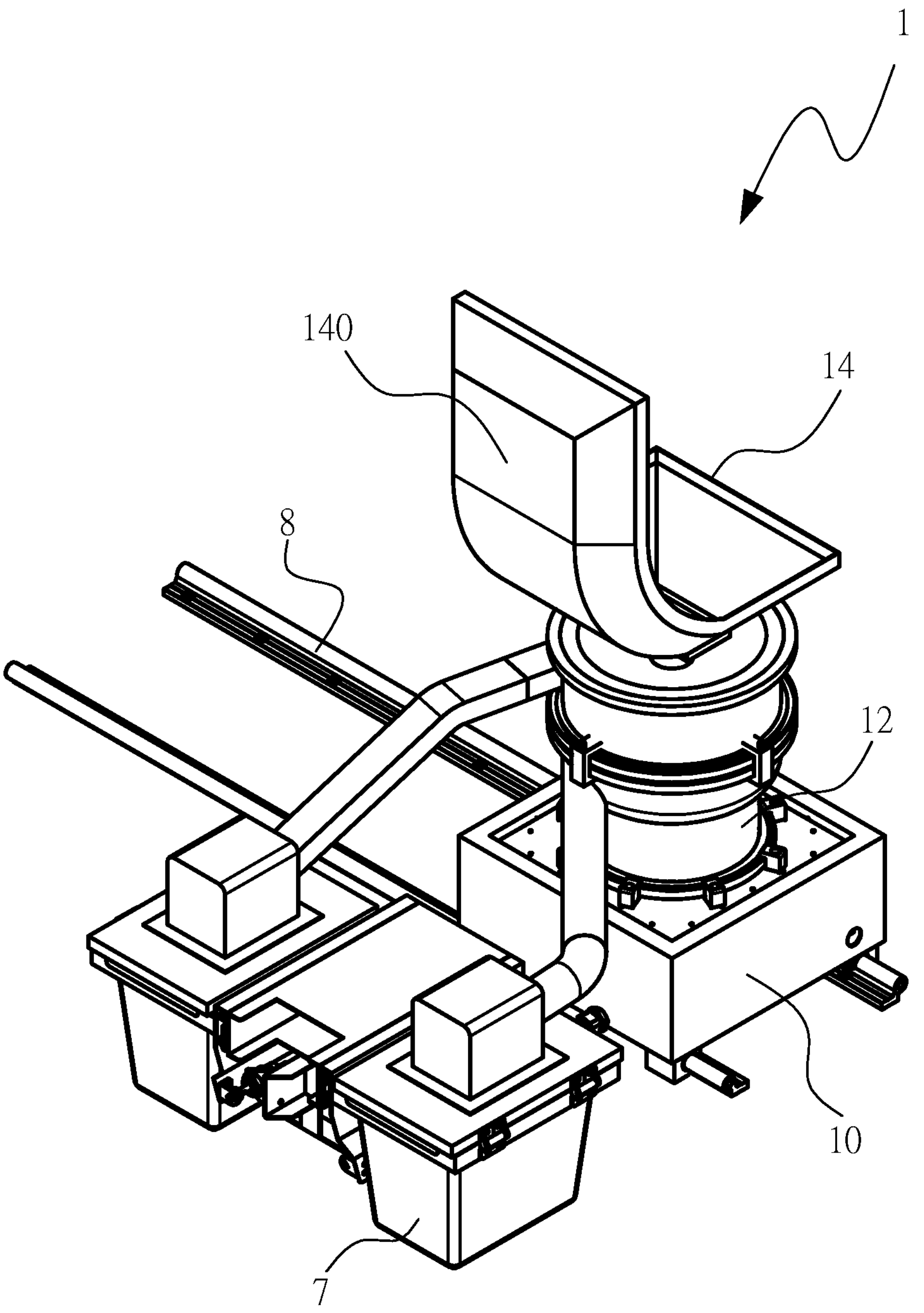
FIG. 3 is a perspective assembly view of the first embodiment of the oscillatory separation device of the invention.

Please refer to FIGS. 1, 2 and 3 for a perspective exploded view, a side exploded view and a perspective assembly view of a first embodiment of an oscillatory separation device of the invention respectively. As shown in the figures, an oscillatory separation device 1 comprises a base 10, an elastic support 11, at least one shell assembly 12, a screen mesh 15, a discharge port 122, and an opening element 13. In this embodiment, the oscillatory separation device 1 is installed in a pharmaceutical factory, and a moving component 8 is disposed in a workstation of the pharmaceutical factory. The moving component 8 comprises but is not limited to slide rails or rollers or any other components capable of achieving moving function, the base 10 is mounted on the moving component 8 to be capable of sliding back and forth. Since jamming of medicine powder is a common problem in pharmaceutical factories during a process of separating medicine tablets, this structural design complies with pharmaceutical regulations, after sliding the oscillatory separation device 1 outside of the workstation through the moving component 8, the oscillatory separation device 1 is directly disassembled and cleaned, and at the same time new shell assembly 12, screen mesh 15 can be replaced to achieve modularization and greatly increase a work efficiency.

The elastic support 11 further has a first end 110 and a second end 111. The elastic support 11 can be a spring air damper or a rubber elastic member or other equivalents. The first end 110 is correspondingly disposed on the base 10, the second end 111 is correspondingly combined with the shell assembly 12 so that the shell assembly 12 is swingably connected to the base 10.

The shell assembly 12 further comprises a first shell 120 and a second shell 121 that are detachably correspondingly combined with each other, a first space 1200 is further formed inside the first shell 120, a second space 1210 is further formed inside the second shell 121, the first and second spaces 1200, 1210 communicate with each other, and the screen mesh 15 is detachably correspondingly disposed between the first and second shells 120, 121 to separate the first and second spaces 1200, 1210.

Figure 4:
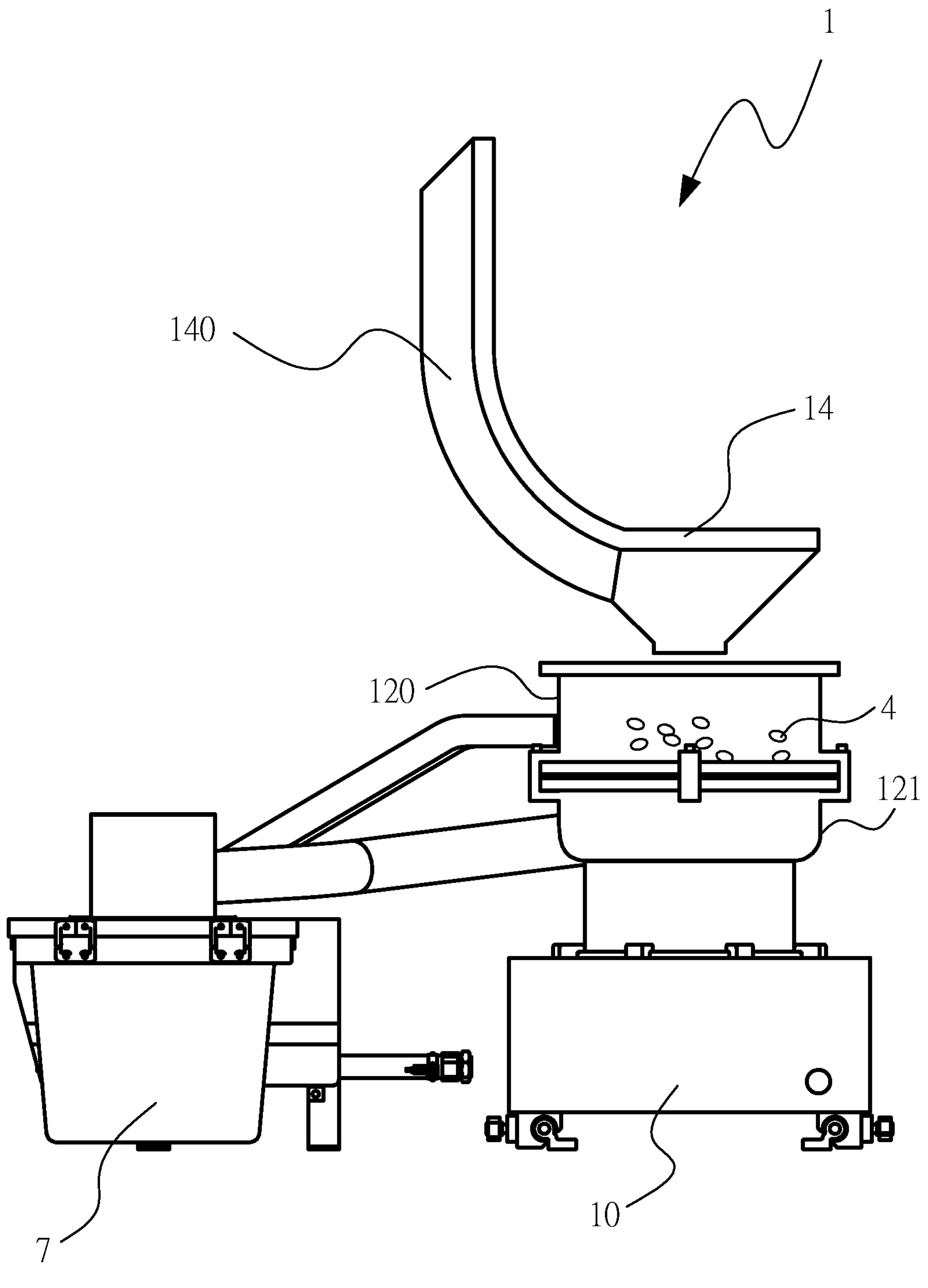
FIG. 4 is a side assembly view of the first embodiment of the oscillatory separation device of the invention.

Furthermore, please refer to FIG. 4, an outer peripheral edge of the first shell 120 further protrudes outward to form a first flange 1201, and an outer peripheral edge of the second shell 121 further protrudes outward to form a second flange 1211, and a buffer element 2 is correspondingly sandwiched between the first and second flanges 1201, 1211. In further explanation, the buffer element 2 and the screen mesh 15 can be integrally formed or non-integrally formed structurally, that is, a groove (not shown in the figures) is formed around the second flange 1211 of the second shell 121, the screen mesh 15 is placed in the groove, through disposition of the buffer element 2, effects of preventing external pollution and sealing between the first and second shells 120, 121 can be achieved to prevent powder of a sieved object 4 (medicine tablet) from being ejected externally.

The discharge port 122 is formed on an outer circumference of the shell assembly 12 and communicates with the first space 1200, the opening element 13 is disposed on the shell assembly 12 and communicates with the first and second spaces 1200, 1210, the sieved object 4 is thrown into the shell assembly 12 through the opening element 13, and is discharged externally from the discharge port 122. In the invention, the sieved object 4 is a medicine tablet formed by 3D printing for illustration.

Continue referring to FIG. 2 and FIG. 4, in addition, a vibrating device 6 is further provided inside the base 10, the vibrating device 6 comprises but is not limited to a motor used for vibrating the shell assembly 12, so that the sieved object 4 in the shell assembly 12 can be oscillated and separated.

In addition, it should be noted that the shell assembly 12 further has a first fixing member 30 and a second fixing member 31, the base 10 and the second shell 121 are locked with each other through the first fixing member 30, and the buffer element 2 and the first and second shells 120, 121 are locked with one another through the second fixing member 31.

In addition, a feeding assembly 14 is further provided on the opening element 13, and the feeding assembly 14 extends upward to form an extension 140 for preventing the sieved object 4 from dispersing and accelerating the sieved object 4 to flow into the shell assembly 12.

It should also be noted that a pressure regulating valve 5 is further provided inside the base 10, and the pressure regulating valve 5 is linked with a pressure regulating device (not shown in the figures). The pressure regulating device comprises but is not limited to a blower or an exhaust fan. If a blower is used, it is disposed on the first shell 120, an airflow generated can blow the sieved object 4 downward to accelerate a sieving rate. If an exhaust fan is used, it is disposed on the second shell 121, air above is pumped downward by means of air extraction to speed up a sieving rate.

Therefore, with the structural design of the invention, after a worker puts the sieved object 4 (medicine tablet) into the shell assembly 12, and then activates the vibrating device 6 to shake the first and second shells 120, 121, the first and second shells 120, 121 will oscillate from side to side due to a structure of the elastic support 11, while the first and second shells 120, 121 are swaying from side to side, residual powder on the sieved object 4 (medicine tablet) will be screened out during a process of swaying and oscillating to achieve an efficacy of removing the residual powder, so that a manufacturing process can be greatly shortened. Since the shell assembly 12 is oscillating from side to side, damage of the medicine tablet caused by bouncing and colliding upward and downward can be avoided. In addition, through a design of the elastic support 11, a buffering effect can be achieved, an oscillatory amplitude of the oscillatory separation device 1 can be greatly reduced, and a surrounding environment and surrounding devices of a pharmaceutical factory will not be affected.

In addition, the shell assembly 12 of the invention is further connected to at least one collection box 7 externally, the sieved object 4 is discharged into the collection box 7 through the discharge port 122, and a structure of the shell assembly 12 is designed to present an eccentric mode, so that during a sieving process performed by the oscillatory separation device 1, the sieved object 4 (medicine tablet) is capable of flowing into the collection box 7 by itself, which is conducive to collection.

Figure 5:
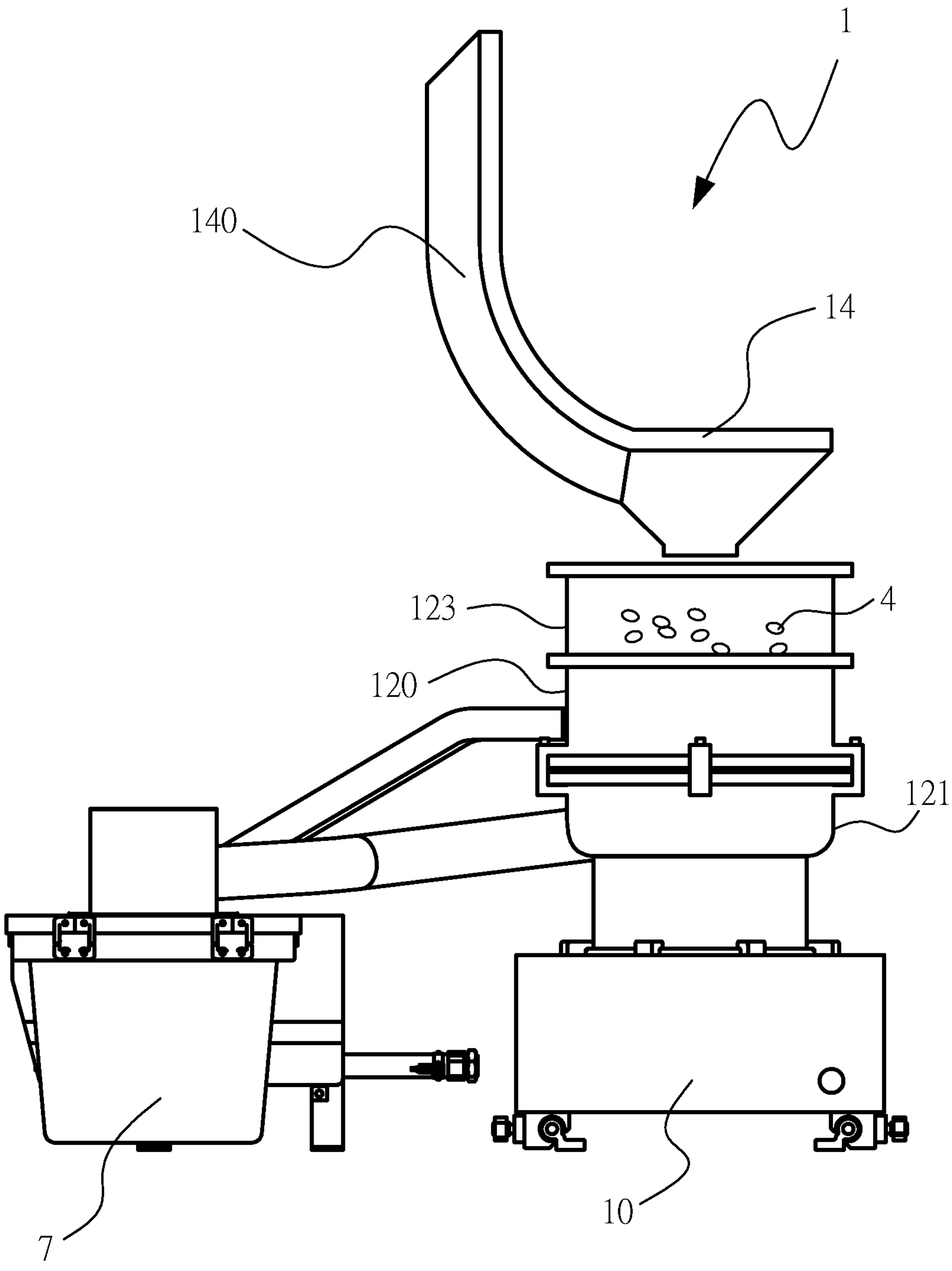
FIG. 5 is a side assembly view of a second embodiment of the oscillatory separation device of the invention.

Finally, please refer to FIG. 5 and FIG. 2 as well, FIG. 5 is a side assembly view of a second embodiment of the oscillatory separation device of the invention. Corresponding relationships between some components of the oscillatory separation device 1 in the second embodiment and the oscillatory separation device 1 in the first embodiment are the same, so they will not be repeated herein, but the most important difference between the oscillatory separation device 1 in the second embodiment and the oscillatory separation device 1 in the first embodiment is that the oscillatory separation device 1 of the second embodiment further has a third shell 123. In other words, a worker can increase or decrease a number of stacked layers of the shell assembly 12 according to fineness requirements of the sieved object 4 to achieve an effect of modularization.

In summary, the invention has the following advantages compared to the prior art:

1. significantly shorten a manufacturing process;
2. avoid damage to medicine tablets;
3. reduce an oscillatory amplitude of the oscillatory separation device;
4. does not affect a surrounding environment and surrounding devices; and
5. capable of achieving efficacies of quick disassembly and replacement.

It is to be understood that the above description is only preferred embodiments of the invention and is not used to limit the invention, and changes in accordance with the concepts of the invention may be made without departing from the spirit of the invention, for example, the equivalent effects produced by various transformations, variations, modifications and applications made to the configurations or arrangements shall still fall within the scope covered by the appended claims of the invention.

What is claimed is:

1. An oscillatory separation device comprising:

a base;

an elastic support, one end of the elastic support being correspondingly disposed on the base;

at least one shell assembly having a first space and a second space communicating with each other, the shell assembly being capable of accommodating a sieved object, a lower part of the shell assembly being correspondingly combined with another end of the elastic support so that the shell assembly being swingably connected to the base;

a screen mesh correspondingly disposed in the shell assembly to separate the first space and the second space, the screen mesh being detachably assembled with the shell assembly;

a discharge port formed on an outer circumference of the shell assembly and communicating with the first space so that the sieved object being discharged externally through the discharge port;

an opening element correspondingly disposed on the shell assembly, the opening element communicating with the first and second spaces, and the sieved object being thrown into the shell assembly through the opening element; and further comprising a moving component, and the base being mounted on the moving component to be capable of sliding back and forth.

2. The oscillatory separation device as claimed in claim 1, wherein the shell assembly further comprises a first shell and a second shell that are detachably correspondingly combined with each other, the first space is formed inside the first shell, the second space is formed inside the second shell, and the screen mesh is disposed between the first and second shells.

3. The oscillatory separation device as claimed in claim 2, wherein an outer peripheral edge of the first shell further protrudes outward to form a first flange, an outer peripheral edge of the second shell further protrudes outward to form a second flange, and a buffer element is correspondingly sandwiched on the first and second flanges.

4. The oscillatory separation device as claimed in claim 3, wherein the buffer element and the screen mesh are integrally formed or non-integrally formed structurally.

5. The oscillatory separation device as claimed in claim 2, wherein the shell assembly further has a first fixing member, so that the base and the second shell are locked with each other through the first fixing member.

6. The oscillatory separation device as claimed in claim 3, wherein the shell assembly further has a second fixing member, and the buffer element and the first and second shells are locked with one another through the second fixing member.

7. The oscillatory separation device as claimed in claim 1, wherein a feeding assembly is further provided on the opening element, and the feeding assembly extends upward to form an extension for preventing the sieved object from dispersing and accelerating the sieved object to flow into the shell assembly.

8. The oscillatory separation device as claimed in claim 1, wherein a pressure regulating valve is further provided inside the base, and the pressure regulating valve is linked with a pressure regulating device.

9. The oscillatory separation device as claimed in claim 1, wherein a vibrating device is further provided inside the base for vibrating the shell assembly so that the sieved object in the shell assembly can be oscillated and separated.

* * * * *